Feb. 9, 1943.  R. E. CROSSLEY  2,310,618
LIGHTING UNIT
Filed Jan. 18, 1940  3 Sheets-Sheet 1

INVENTOR:
Royal E. Crossley,
BY Bodell & Thompson
ATTORNEYS.

Feb. 9, 1943.     R. E. CROSSLEY     2,310,618
LIGHTING UNIT
Filed Jan. 18, 1940     3 Sheets-Sheet 2
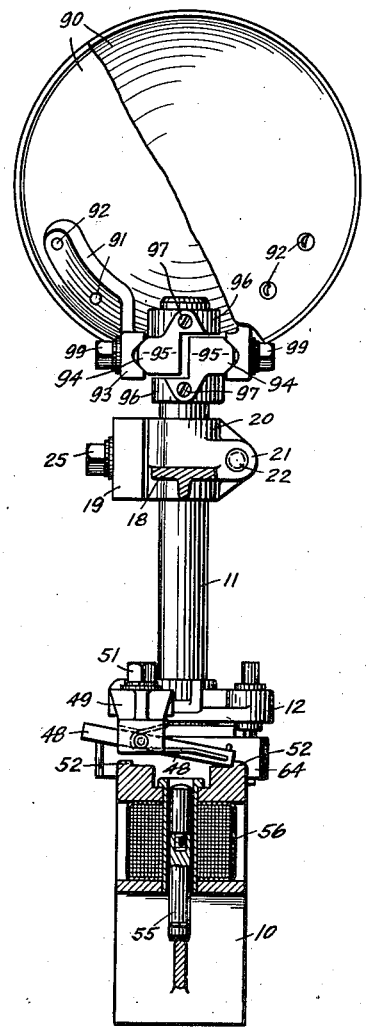
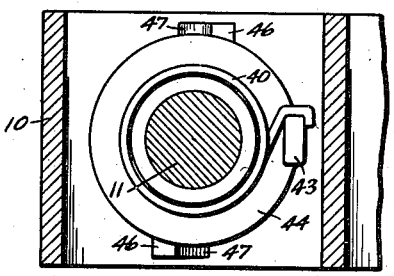
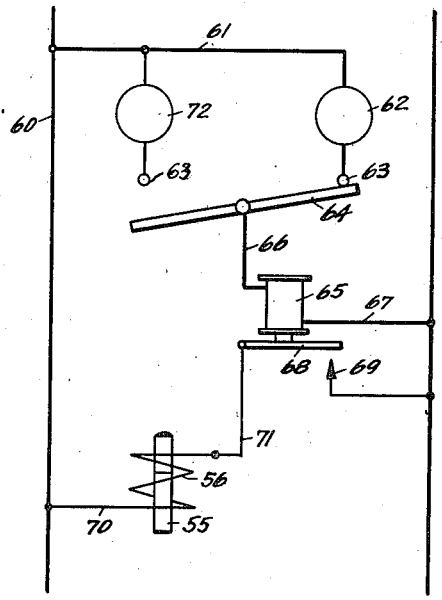
INVENTOR:
Royal E. Crossley,
BY Bodell & Thompson
ATTORNEYS.

Feb. 9, 1943.   R. E. CROSSLEY   2,310,618
LIGHTING UNIT
Filed Jan. 18, 1940   3 Sheets-Sheet 3
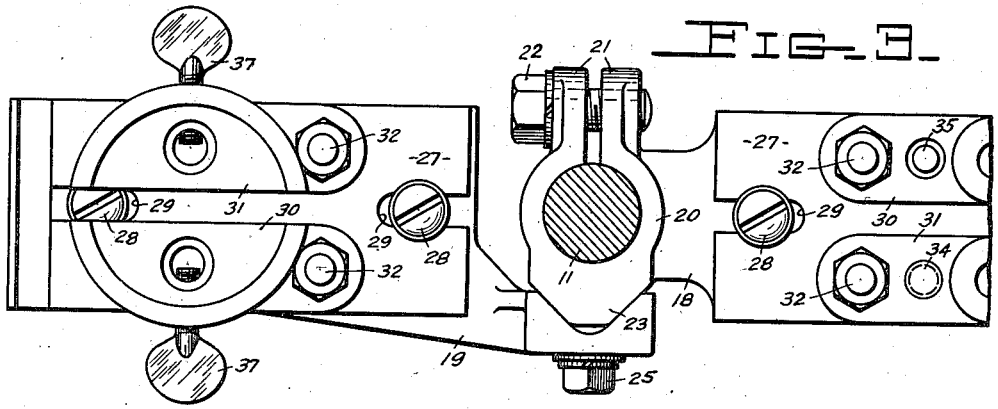
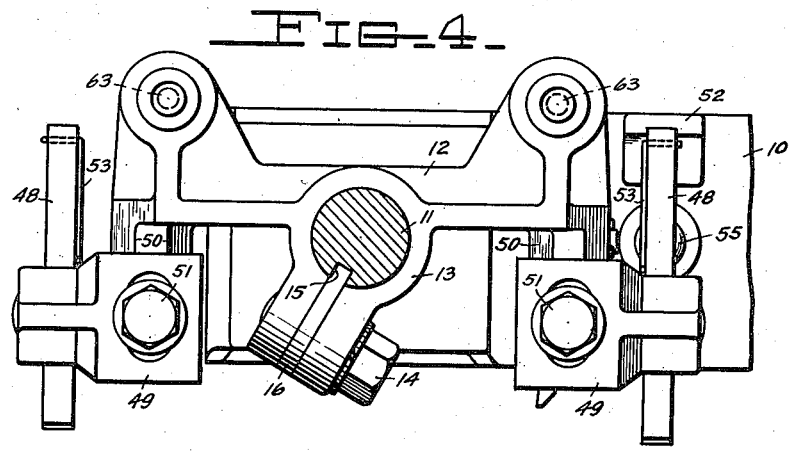
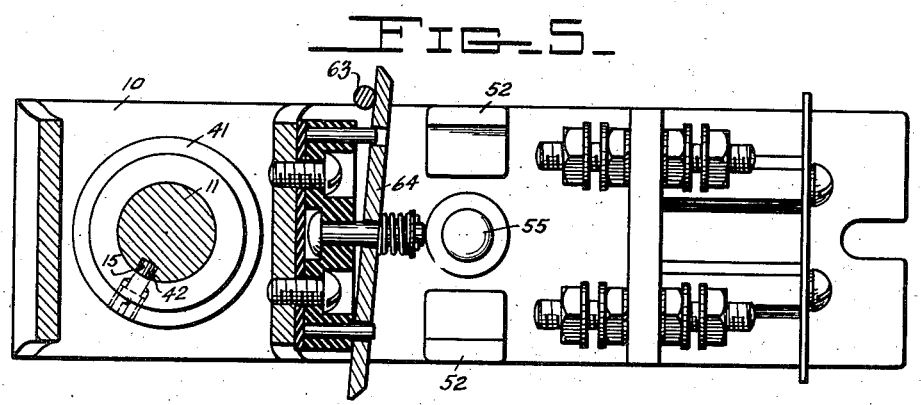
INVENTOR:
*Royal E. Crossley,*
BY *Bodell & Thompson*
ATTORNEYS.

Patented Feb. 9, 1943

2,310,618

UNITED STATES PATENT OFFICE 2,310,618

LIGHTING UNIT

Royal E. Crossley, Fayetteville, N. Y., assignor to Crouse-Hinds Company, Syracuse, N. Y., a corporation of New York Application January 18, 1940, Serial No. 314,465

4 Claims. (Cl. 240—44)

This invention relates to an electrical lighting unit and while several features of the invention may be advantageously employed in various types of lighting units, the invention is here shown in the nature of a multiple lamp and reflector unit embodying means whereby, upon failure of one lamp, mechanism is operable to shift the unit in order to position a new lamp in place of the one burned out.

Lighting units of this type and other types, such as floodlights, are usually mounted upon high supporting objects and in such manner that it is extremely difficult for a workman to make adjustments of the various elements of the unit in order to properly focus the same.

This invention has as an object a particularly economical and efficient means whereby the reflectors, lamp receptacles, and other elements of the unit, may be adjusted by manipulation of a single element such as a screw, the workman being able to make the adjustment with one hand.

The invention has as a further and more specific object, a particularly simple means for adjusting the torsion spring employed to actuate the lamp changing mechanism.

The invention consists in the novel features and in the combinations and constructions hereinafter set forth and claimed.

In describing this invention, reference is had to the accompanying drawings in which like characters designate corresponding parts in all the views.

Figure 2 is a side elevational view of the structure shown in Figure 1 with the parts omitted.

Figures 3, 4 and 5 are views taken on substantially lines 3—3; 4—4; 5—5; respectively, Figure 1.

Figure 6 is a top plan view of the torsion spring adjusting collar and contiguous portions of the base.

Figure 7 is a schematic wiring diagram illustrating the electrical circuit of the device.

Figure 1:
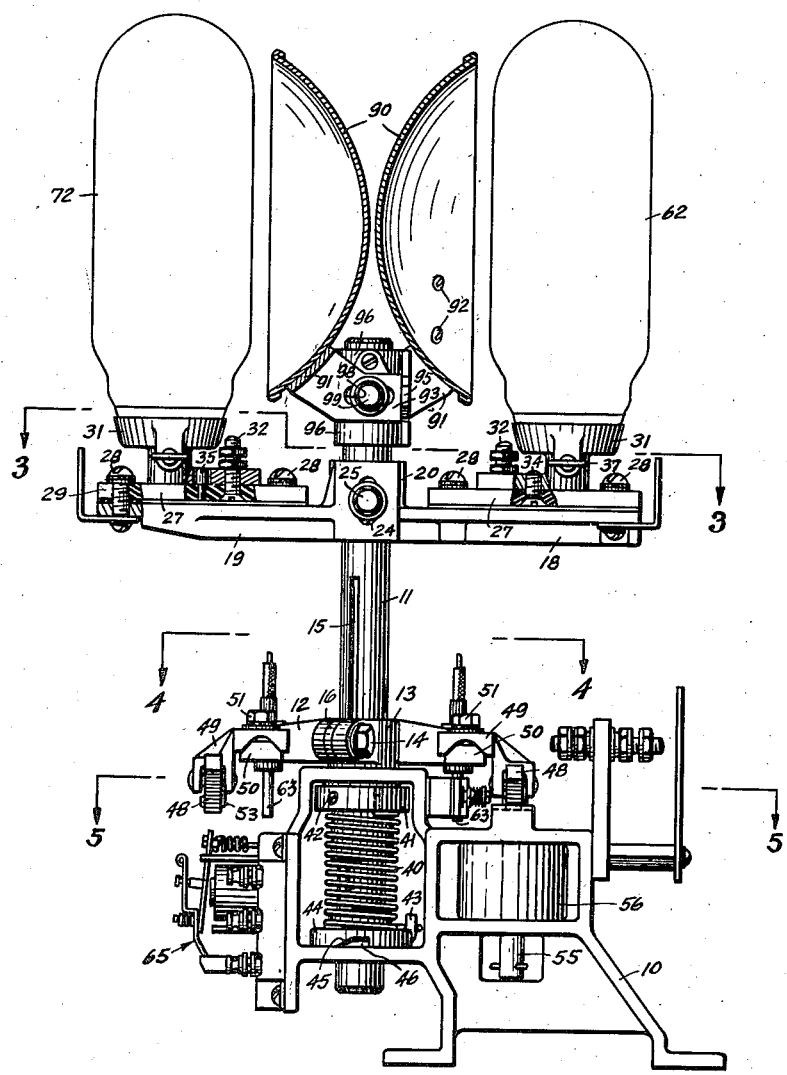
Figure 1 is a side elevational view of a lighting unit embodying features of my invention.

The embodiment of the invention illustrated is known as an automatic lamp changer. Such devices are employed in directional beacons used in lighthouse and airway service and the like.

The unit consists of a base 10 which is mounted by suitable means in the casing of the beacon. A vertically arranged stem 11 is rotatably journalled in the base. The stem 11 is supported by a transversely extending bracket 12, the hub 13 of which is split and provided with a clamping screw 14 whereby the bracket may be adjusted axially of the stem 11. The stem is formed with an axially extending keyway 15 and a key 16 is arranged in the hub 13 with the inner portion of the key engaging the keyway 15, whereby the bracket 12 is maintained against rotation relative to the stem 11 in all adjusted positions. A pair of radially extending brackets 18, 19 are mounted upon the upper portion of the stem 11 and serve as lamp receptacle supports. The bracket 18 is formed with a hub 20 having an aperture to receive the stem 11 and being provided with spaced bosses 21 to receive a clamping screw 22 whereby the bracket 18 is also adjustable axially of the stem 11.

The side of the hub 20 opposite the bosses 21 is formed with an axially extending boss 23 in the nature of a rib having a V surface. The inner portion of the bracket 19 is formed with a groove complemental to the boss 23 and is slidable along the boss to effect adjustment of the bracket 19 relative to the bracket 18. The bracket 19 is formed with an elongated slot 24 to receive a clamping screw 25 to secure a bracket 19 to the boss 23 in adjusted position.

Any suitable lamp receptacle may be mounted upon the brackets 18, 19, preferably in a manner to provide some radial adjustment. The lamp receptacles here shown are of the type to receive a prong base lamp and consist of a plate 27 secured to the brackets 18, 19, as by screws 28, the plate 27 being formed with slots 29 extending inwardly from each end to permit the plate to be shifted toward and from the axis of the stem 11. The plate 27 is formed of insulating material, and a pair of metallic plates 30, 31 are mounted upon each of the plates 27, the inner portion of the plates 30, 31 being secured to the plate 27 as by screws 32 which also serve as binding posts for the lead wires to the receptacle. One of the plates as 31 is fixedly secured from rotation about the screw 32 by a screw 34, while the other plate as 30 is permitted to pivot about the screw 32 in order to accommodate variation in the spacing of the lamp prongs. This pivotal movement is permitted by a pin 35 having a head of less dimension that the aperture in the plate 30. The lamp prongs are fixedly secured in the plates 30, 31 as by thumb screws 37.

The stem 11 is urged to rotate in a counterclockwise direction, Figures 3, 4 and 6, by a torsion spring 40 encircling the lower portion of the stem and having one end fixed to a collar 41 secured against rotation to the stem 11 by a set screw 42, the inner end of which is arranged in the keyway 15. The opposite end of the spring engages an upwardly extending projection 43 formed on a collar 44 loosely mounted upon the stem 11, see Figures 1 and 6. The tension of the spring 40 is increased or decreased by rotatable adjustment of the collar 44, and means is provided for securing the collar 44 in adjusted position.

The under side of the collar 44 is formed with diametrically opposed notches 45, one end wall of the notch extending parallel to the axis of the stem 11, and the opposite end wall extending in angular relationship thereto. The base is likewise provided with a pair of projections 46 formed with inclined surfaces 47 complemental to the inclined end walls of the notches 45. The arrangement is such that when the collar 44 is rotated in a counterclockwise direction, Figure 6, the collar is cammed upwardly against the pressure of the spring 40, and when the collar has been rotated 180°, or when the notches 45 are alined with the projections 46, the collar drops over the projections 46 and is accordingly held from retrograde movement. The tension of the spring 40 may be decreased by moving the collar 44 upwardly by a screw-driver or like tool until the collar clears the projections 46, whereupon the collar is rotated in reverse direction by the spring 40.

The stem 11 is held against rotation under the influence of the spring 40 by a latch 48 pivotally mounted at each end of the bracket 12. Each latch 48 is pivotally mounted to a block 49. The ends of the bracket 12 are formed with ribs 50 extending transversely of the bracket. The blocks 49 are formed with grooves complemental to the ribs 50, whereby the blocks are adjustable along the ends of the bracket and are secured thereto in adjusted position as by clamping screws 51.

At one side of the stem 11 the base 10 is provided with projections 52 and the latches 48 are urged into engagement with these projections by springs 53. The arrangement is such that when one of the lamps, as 62, is positioned in the focal axis of the beacon reflector, the latch 48 engages one of the projections 52. When the lamp so initially positioned burns out, the latch 48 is moved upwardly out of engagement with the projection 52 permitting the stem 11 and the elements carried thereby to be rotated 180° by action of the spring 40. The stem is again locked against return movement by the latch 48 at the opposite end of the bracket 12 engaging the opposed projection 52.

The latches 48 are moved upwardly out of engagement with the projections 52 by a solenoid core 55. When the first lamp is in operative position, the coil 56 surrounding the core 55 is deenergized until failure of the lamp, whereupon the coil is energized causing the core to trip the latch 48. The circuit to accomplish this operation is as follows: Feed wire 60, wire 61, lamp 62, contact 63 depending from the bracket 12 and engaging a yieldable contact plate 64 connected to the coil of a relay 65 by wire 66, the circuit being completed through the relay 65 to the opposite side of the line by wire 67. The relay 65 is thus energized maintaining its armature 68 out of engagement with the contact 69. The coil 56 of solenoid 55 is connected to the feed wire 60 by wire 70, and is connected to the armature 68 by wire 71. Accordingly, when lamp 62 is in burning position, the solenoid coil 56 is deenergized. Upon failure of the lamp 62, the relay 65 becomes deenergized permitting the armature 68 to engage contact 69 completing a circuit through the coil 56. The core 55 is then elevated, moving the latch 48 out of engagement with the base and permitting the stem 11 to be rotated under the action of the spring 40 to bring the lamp 72 into operative position. Rotation of the stem 11 under the influence of spring 40 is arrested by the depending contact 63 associated with lamp 72 engaging the opposite end of the yieldable contact bar 64 which also functions, see Figure 5, to urge the stem 11 in a clockwise direction which is prevented however by engagement of the second latch 48 with the opposite projection 52. The brackets 49 are adjustable relative to the plate 12 in order that the latches 48 may correctly position each of the lamps 62, 72 in the focal axis of the reflector. The contact 63 associated with the lamp 72 being now in engagement with the yieldable bar 64, the circuit for this lamp is completed through wire 66, relay 65, wire 67, to the opposite side of the line.

In order to increase the efficiency of the beacon, the lighting unit is provided with an auxiliary or spill light reflector 90 for each of the lamps 62, 72, and means is provided for adjusting the reflectors individually in both the vertical and horizontal direction. Each reflector is secured to a bracket 91 as by screws 92. The base portion 93 of each of the brackets is formed with a groove to receive the rib 94 formed on a depending portion 95 of a collar 96. The collars 96 are adjustable axially of the stem 11 and are secured in adjusted position as by set screws 97. The brackets 91 are adjustable along the ribs 94 and are formed with elongated slots 98 to receive clamping screws 99. With this structure, each auxiliary reflector 90 may be adjusted vertically to register with the light source of the lamps 62, 72, and the reflector may be then adjusted laterally in order to properly reflect the light onto the main reflector of the beacon or searchlight.

The rib and groove adjustment for the receptacle plates 18, 19, latches 48, and auxiliary reflectors 90, permits these elements to be adjusted in a most convenient manner, it being necessary to only loosen the clamping screws 25, 51, 99 slightly. Due to the rib and groove construction, the movable elements do not fall or swing out of alinement and accordingly, the adjustment can be made by the workman employing only one hand. This feature is of importance as lighting units are often mounted in comparatively inaccessible places, such as ledges on tall buildings, or on the tops of poles or towers where it is necessary for the workman to employ one hand to keep from falling.

What I claim is:

1. A lighting unit comprising a support, a receptacle supporting bracket carried by said support, the abutting surfaces of said support and receptacle bracket being provided with a rib and groove formation, said receptacle bracket being adjustable relative to the support along said rib and groove formation, and a screw extending through the bracket and threading into the support and operable to clamp said bracket to said support in adjusted position, and forming the sole means for attaching the bracket to the support, a reflector bracket carried by said support, the abutting surfaces of said support and said reflector bracket being also provided with a rib and groove formation extending in angular direction to the rib and groove formation between said support and receptacle bracket, said reflector bracket being adjustable along said rib and groove formation, and a screw extending through the reflector bracket and threading into the support to clamp said reflector bracket to said support in adjusted position and said screw forming the sole means for attaching the reflector bracket to the support.

2. A lighting unit comprising a vertically arranged support, a receptacle bracket mounted on said support and being adjustable axially thereof, a second receptacle bracket mounted on said first bracket, the abutting surfaces of said receptacle brackets being provided with a rib and groove formation extending axially of said first mentioned support, said second bracket being adjustable along said rib and groove formation, and means operable to clamp said second bracket to said first receptacle bracket in adjusted position.

3. A lighting unit comprising a vertically arranged support, a receptacle bracket mounted on said support and being adjustable axially and rotatably thereof, a second receptacle bracket mounted on said first bracket, the abutting surfaces of said brackets being formed with a rib and groove formation, said second bracket being adjustable along said formation, and clamping means cooperable to clamp the second bracket to the first bracket in adjusted position.

4. A lighting unit comprising a support, a lamp receptacle bracket carried by the support, a lamp receptacle mounted on said bracket, a collar mounted on said support and being adjustable axially and rotatable of said support, a reflector bracket mounted on said collar, the abutting surfaces of said bracket and collar being provided with a rib and groove formation, said bracket being adjustable along said formation toward and from the receptacle, and clamping means cooperable to clamp the bracket to the collar in adjusted position.

ROYAL E. CROSSLEY.